(12) United States Patent
De Lorenzo et al.

(10) Patent No.: US 12,435,827 B2
(45) Date of Patent: Oct. 7, 2025

(54) INSPECTION TOOL

(71) Applicant: Quest Integrity USA, LLC, Houston, TX (US)

(72) Inventors: Robert Victor De Lorenzo, Seattle, WA (US); Paul Manzak, Kent, WA (US); Colum Mark Holtam, Stafford, TX (US); Charles Jess Lee, Kent, WA (US)

(73) Assignee: Quest Integrity USA, LLC, Stafford, TX (US)

( * ) Notice: Subject to any disclaimer, the term of this patent is extended or adjusted under 35 U.S.C. 154(b) by 35 days.

(21) Appl. No.: 17/919,609

(22) PCT Filed: Apr. 21, 2021

(86) PCT No.: PCT/US2021/028321
§ 371 (c)(1),
(2) Date: Oct. 18, 2022

(87) PCT Pub. No.: WO2021/216654
PCT Pub. Date: Oct. 28, 2021

(65) Prior Publication Data
US 2023/0160518 A1 May 25, 2023

Related U.S. Application Data

(60) Provisional application No. 63/013,323, filed on Apr. 21, 2020.

(51) Int. Cl.
*F16L 55/48* (2006.01)
*F16L 55/32* (2006.01)
(Continued)

(52) U.S. Cl.
CPC ............... *F16L 55/48* (2013.01); *F16L 55/32* (2013.01); *F16L 55/38* (2013.01); *F16L 2101/30* (2013.01)

(58) Field of Classification Search
CPC . F16L 55/48; F16L 55/32; F16L 55/38; F16L 2101/30; F16L 55/30; F16L 55/28
See application file for complete search history.

(56) References Cited

U.S. PATENT DOCUMENTS 3,576,043 A * 4/1971 Zongker ............... B08B 9/0553
15/104.061
3,837,214 A * 9/1974 Guest ................... F16L 55/1283
73/40.5 R (Continued)

FOREIGN PATENT DOCUMENTS

EP 0805926 A1 11/1997
EP 1256756 A1 11/2002

(Continued)

OTHER PUBLICATIONS

International Search Report and Written Opinion in related application PCT/US21/28321 dated Jul. 21, 2021.

(Continued)

*Primary Examiner* — David Z Huang
(74) *Attorney, Agent, or Firm* — Christensen, O'Connor Johnson Kindness PLLC

(57) ABSTRACT

A system and method for inspecting offshore and onshore tubular or piping assets is described. The system and method utilizes an inspection tool comprising a communication system, a sensor, a long distance travel system, and a localized travel system, allowing fast long distance travel until the inspection tool approximates an area of interest, followed by actuating the localized travel system to accurately inspect the area of interest.

19 Claims, 15 Drawing Sheets

(51) Int. Cl.
*F16L 55/38* (2006.01)
*F16L 101/30* (2006.01)

(56) References Cited

U.S. PATENT DOCUMENTS

| | | | |
|---|---|---|---|
| 4,094,492 | A | 6/1978 | Beeman et al. |
| 4,654,702 | A | 3/1987 | Tolina et al. |
| 5,142,990 | A * | 9/1992 | Leonard ............... F16L 55/30 |
| | | | 104/138.2 |
| 5,172,639 | A | 12/1992 | Wiesman et al. |
| 5,219,001 | A | 6/1993 | Rennaker |
| 6,944,902 | B1 | 9/2005 | Richter |
| 7,472,722 | B2 | 1/2009 | Nadarajah et al. |
| 7,673,654 | B2 | 3/2010 | Rice |
| 7,673,655 | B1 | 3/2010 | Morton |
| 7,900,655 | B2 | 3/2011 | Morton et al. |
| 2004/0217759 | A1 | 11/2004 | Burkhardt et al. |
| 2005/0220252 | A1 * | 10/2005 | Tashiro ............... G21C 17/017 |
| | | | 376/260 |
| 2008/0011063 | A1 | 1/2008 | Smith et al. |
| 2016/0273992 | A1 | 9/2016 | Frueh |
| 2019/0086368 | A1 | 3/2019 | Plichta et al. |
| 2019/0093813 | A1 * | 3/2019 | Badger ............ F16L 55/16455 |

FOREIGN PATENT DOCUMENTS

| | | |
|---|---|---|
| ES | 1067909 U | 7/2008 |
| WO | 2018134657 A1 | 7/2018 |
| WO | 2019195329 A1 | 10/2019 |

OTHER PUBLICATIONS

Supplementary European Search Report in related appliction EP 21793387 dated Mar. 5, 2024.

1st Office Action received Jun. 6, 2025, for Mexican Application No. MX/a/2022/013158, filed Apr. 21, 2021; 10 pages total, including translation.

* cited by examiner

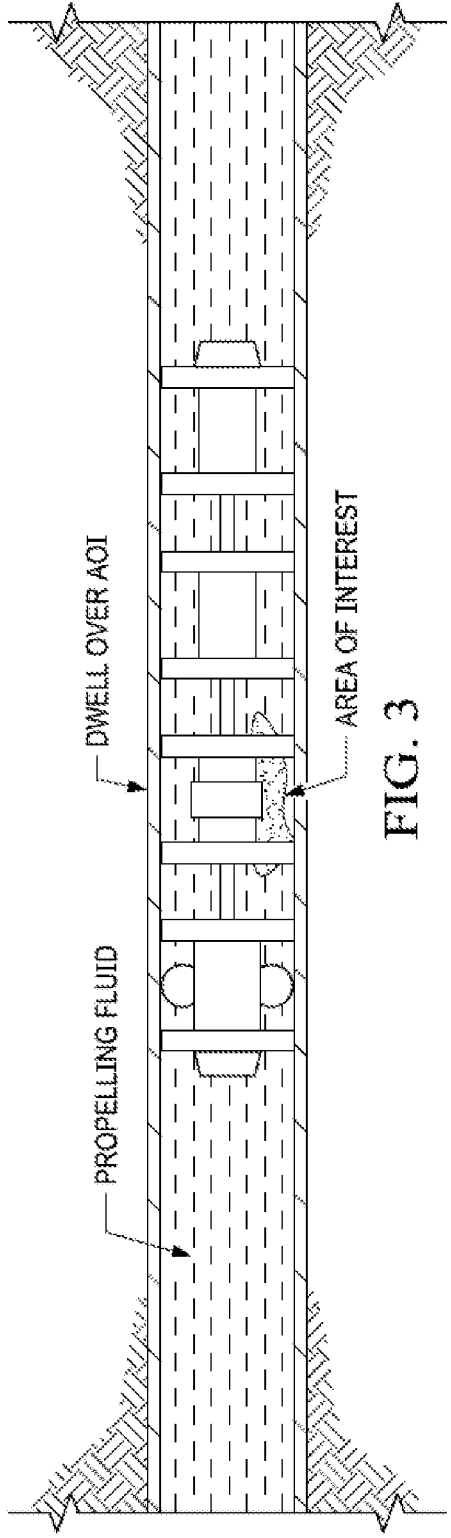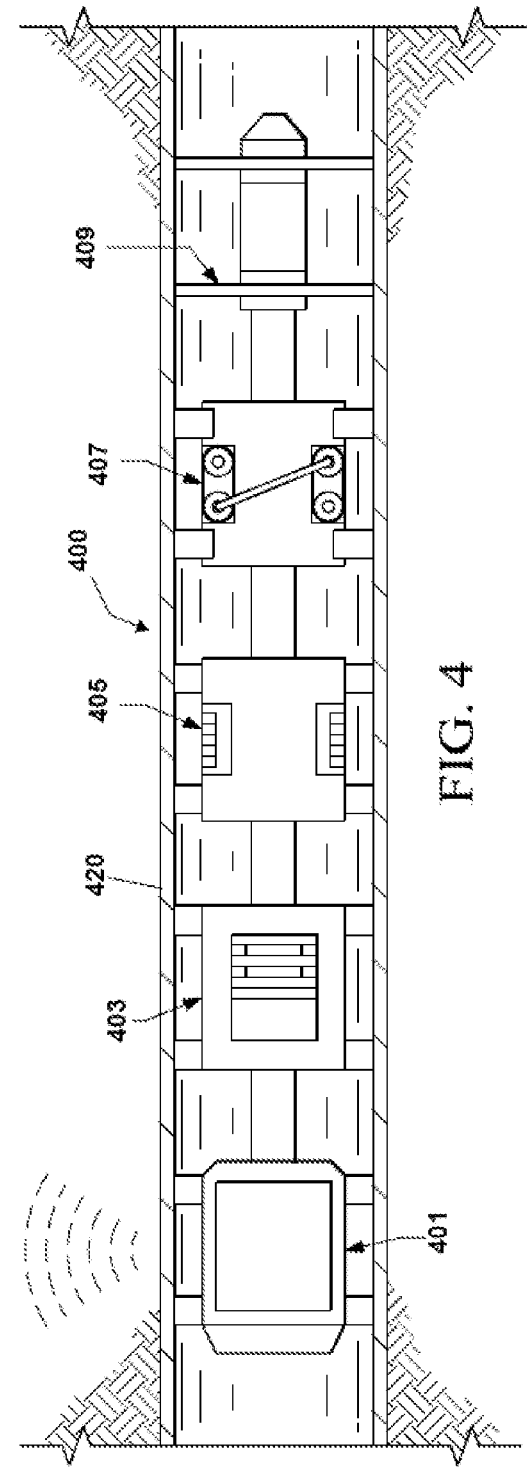

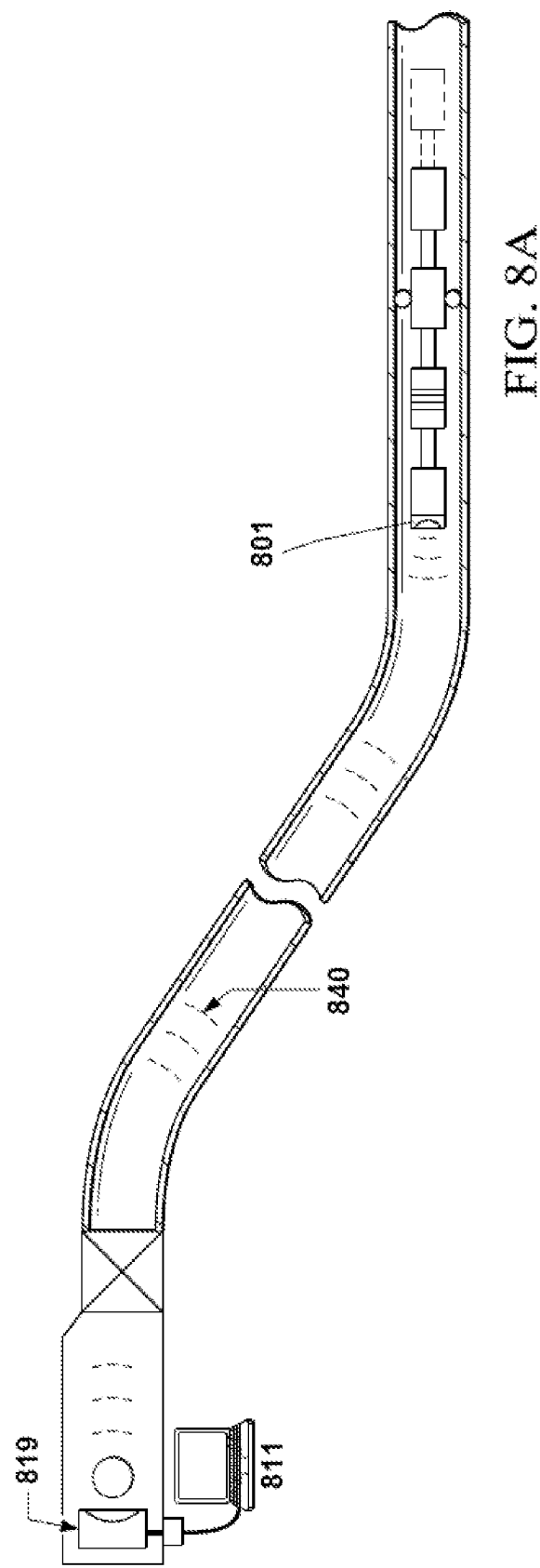

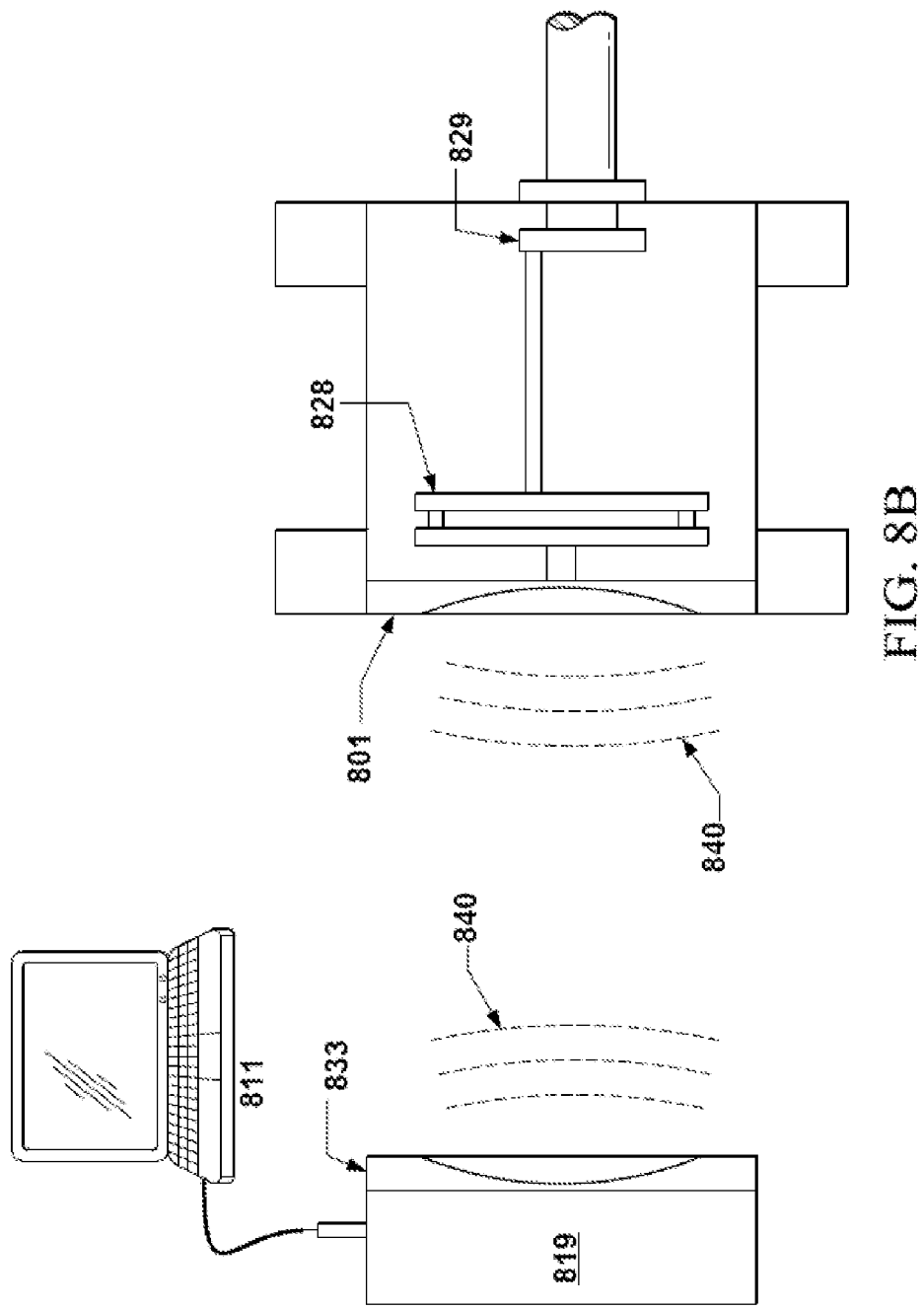

INSPECTION TOOL

PRIOR RELATED APPLICATIONS

This application claims priority to U.S. Ser. No. 63/013,323, filed on Apr. 21, 2020, which is incorporated by reference in its entirety for all purposes

FIELD OF INVENTION

In general, the disclosure describes a system and methodology for facilitating structural integrity assessment, gain life extension or for prove-up on offshore and onshore tubular or piping assets.

BACKGROUND OF INVENTION

The oil and gas industry relies on both onshore and offshore pipelines to transfer raw and refined product. These assets are susceptible to both internal and external corrosion, stress, fatigue, fracture and damage from foreign bodies. These irregularities are typically checked through either in-line inspection (ILI) or external inspection of the pipelines.

Offshore pipelines and risers are used by the oil and gas industry to transfer product from beneath the seabed to the surface. These pipelines and risers consist of numerous sections of pipe which are welded together and can presently reach water depths upwards of 8,000 feet. The full riser assembly is attached to a platform on the surface and transitions to an offshore pipeline after touching down on the seabed. On the production side, the pipeline connects to subsea equipment infrastructure such as a Pipeline End Termination (PLET). On the export side, the pipeline may connect to another fixed or floating offshore facility, an onshore terminal, or tie in to another offshore pipeline. There are several common riser system configurations, including but not limited to free hanging and lazy wave steel catenary risers (SCRs).

During their operational lifetimes, offshore pipelines and risers are susceptible to both internal and external corrosion from use and submersion. These systems are also subject to fatigue loading and stresses applied to various points of the system by ocean currents and wave induced motion (WIM), vortex induced vibration (VIV), vessel induced motion (VIM), internal pressure and the weight of the piping itself. Some critical areas of interest are concentrated at the hang-off and touchdown regions of the riser and specifically the girth welds within those regions or critical locations identified along its length, as indicated in FIG. 1 (Minerals Management Service, 2007).

Girth welds are particularly susceptible to high stress, fatigue loading and fracture. Current methodologies for inspecting girth welds may involve any of the following: radiography, external or internal ultrasonic inspection, Magnetic Flux Leakage (MFL) or eddy current, acoustic emission, and computed tomography.

Onshore pipeline systems are typically easier assets to inspect and/or verify, but they present their own challenges with regards to physical location. Many pipelines are buried or located in other hard to access locations, which requires the operator to excavate the pipeline before external inspection or verification can occur. This presents difficulties when a pipeline passes under populated areas or infrastructure, as indicated in FIG. 2.

Offshore risers, offshore pipelines and buried onshore pipelines present some of the most difficult scenarios for non-destructive testing (NDT) inspection. A report from the Bureau of Safety and Environmental Enforcement's (BSEE) Technology Assessment & Research (TAR) program acknowledges that most operators maintain their riser systems using risk-based integrity management approaches in addition to minimum federal safety standards (Minerals Management Service, 2007). Theoretical mathematical and software models are currently used to predict fatigue damage, but do not help determine the actual state of a system.

Existing NDT methods are largely unrealistic for in-service inspection of hard to access pipeline systems. Radiography presents safety concerns both onshore and offshore and cannot cover entire existing offshore pipelines as these assets can operate in thousands of feet of sea water. External inspection of offshore assets can be impeded by buoyancy modules or support pylons and buried pipelines must be excavated before external inspection can occur. Visual or sonar inspections by a remote operated vehicle (ROV) can lack the resolution of other inspection tools and do not capture internal corrosion. Current internal ultrasonic and MFL methods rely on an ILI tool continuously collecting data as it traverses the pipeline. Many pipeline assets are considered unpiggable due to internal restrictions, wall thickness transitions or tight bends and extreme operating conditions such as high pressure and temperature. Data resolution of traditional inspection methods also decreases as the speed of the tool increases.

What is needed, is an inspection method and system that resolves these issues by allowing a tool to stop at an area or areas of interest to collect localized data. Since the inspection tool would have zero or near-zero velocity while an active inspection occurs, data resolution would be optimized and can provide a clearer picture of the area than existing inspection methods allow.

SUMMARY

This summary is provided to introduce a selection of concepts that are further described below in the detailed description. However, many modifications are possible without materially departing from the teachings of this disclosure. Accordingly, such modifications are intended to be included within the scope of this disclosure as defined in the claims. This summary is not intended to identify key or essential features of the claimed subject matter, nor is it intended to be used as an aid in limited the scope of the claimed subject matter.

An embodiment of the present disclosure provides an inspection tool for inspecting a localized area of interest. The inspection tool comprises a communication system providing communication between the inspection tool and a controller; a long distance travel system; and a localized travel system. The communication system controls the travel system of the inspection tool.

Another embodiment of the present disclosure provides a method for performing an inspection of an area of interest in a pipe. The method comprising the steps of: (a) conveying an inspection tool into the pipe, the inspection tool comprising a communication system, a long distance travel system, and a localized travel system; (b) activating the long distance travel system until the inspection tool is proximate the area of interest; and (c) activating the localized travel system to perform the inspection of the area of interest.

BRIEF DESCRIPTION OF THE FIGURES

Certain embodiments of the disclosure will hereafter be described with reference to the accompanying drawings, wherein like reference numerals denote like elements. It is emphasized that, in accordance with standard practice in the industry, various features are not drawn to scale. In fact, the dimensions of various features may be arbitrarily increased or reduced for clarity of discussion. It should be understood, however, that the accompanying figures illustrate the various implementations described herein and are not meant to limit the scope of various technologies described herein, and:

FIG. 3 is a schematic of an embodiment of the inspection tool of the present disclosure;

FIG. 4 illustrates an embodiment of the long distance drive system of the present disclosure;

FIG. 8A-B illustrates the pulsed transducer/guided wave communication system of an embodiment of the present disclosure;

DETAILED DESCRIPTION

Figure 1:
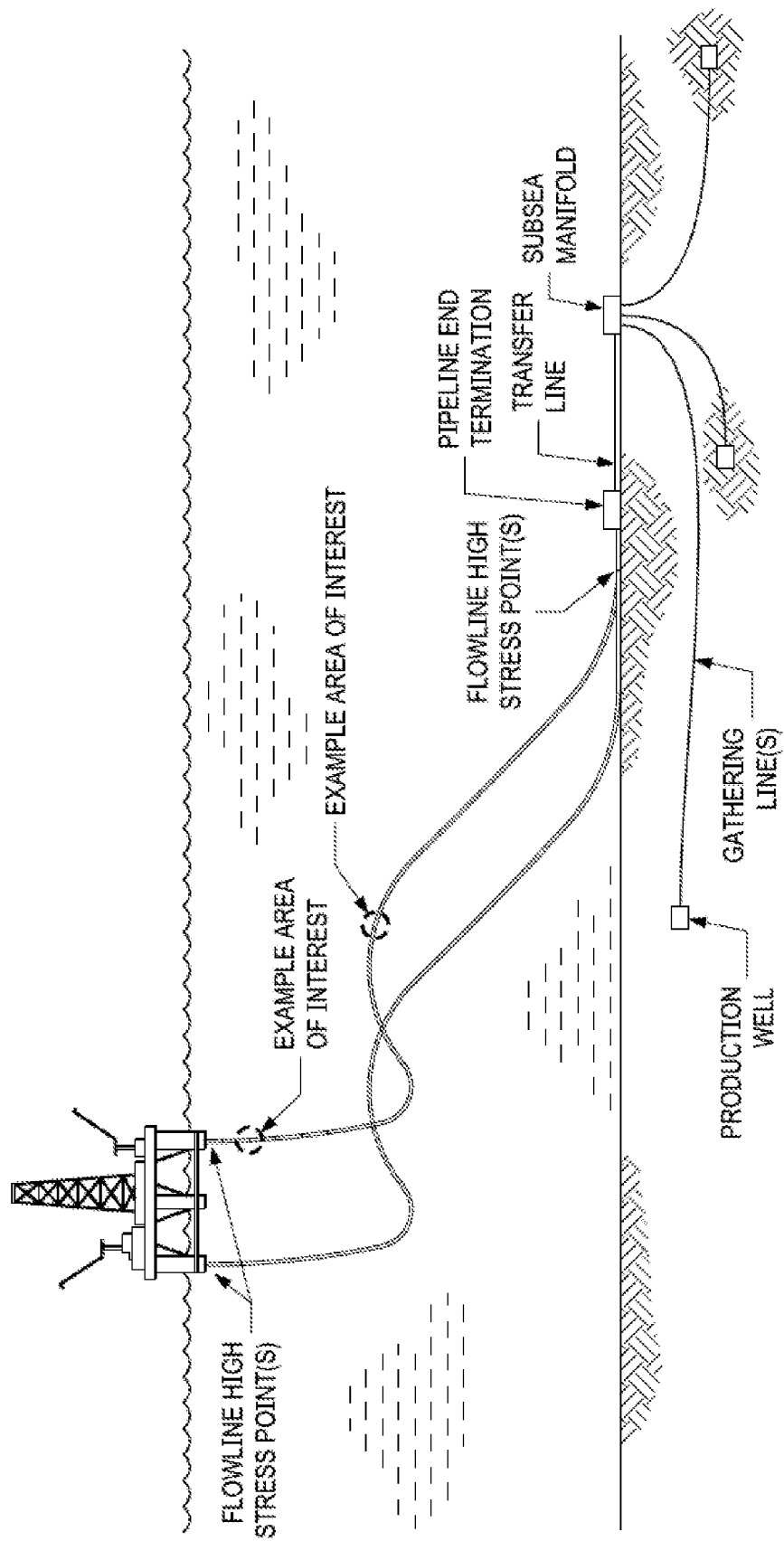
FIG. 1 is schematic diagram of a typical subsea riser line connecting to a subsea production well.
Figure 2:
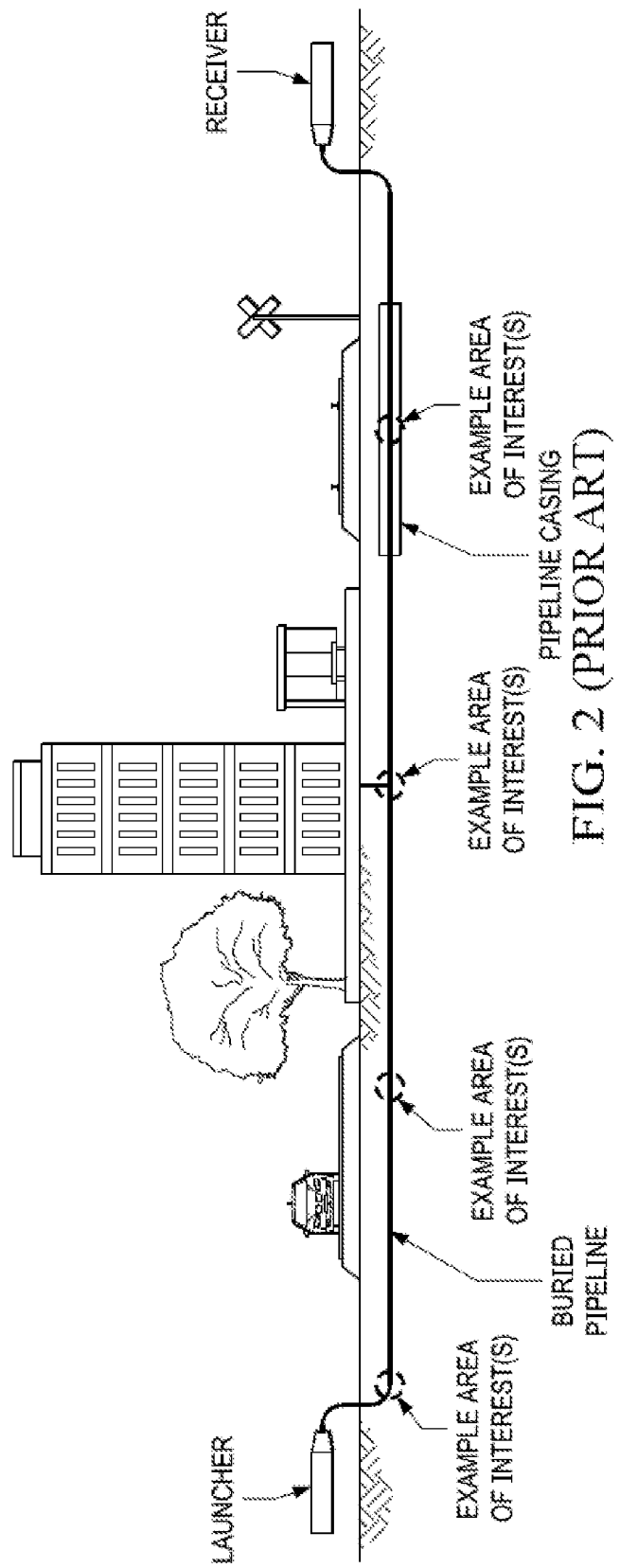
FIG. 2 is an example of an onshore line.

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements.

The present disclosure describes embodiments of a system and methodology for facilitating structural integrity assessment, gain life extension or for prove-up on, but not limited to, offshore risers (production, export and drilling risers), offshore pipelines, flowlines, gathering lines and injection lines, flexible risers and pipelines, access restricted onshore pipelines, and other offshore and onshore tubular or piping assets. This is accomplished by examining areas of critical interest on the unit under inspection and recording measurements, either on the inside or outside of the system.

Embodiments of the method and system enable a tool to stop at an area or areas of interest to collect localized data. Since the inspection tool has zero or near-zero velocity while an active inspection occurs, data resolution is optimized and can provide a clearer picture of the area than existing inspection methods allow.

The present disclosure describes a system and methodology used to detect, dwell and perform detailed inspections on specific areas of critical interest within onshore and offshore pipelines, offshore risers (including but not limited to production, export and drilling risers), and other tubular or piping assets commonly used in the power and oil & gas industries in order to provide relevant data needed to assess structural integrity, gain life extension or for prove-up of said assets.

Areas of interest include, but are not exclusive to, girth welds at or close to the hang-off and touchdown regions of a riser (or other critical locations identified along the length of the riser), other girth welds along a pipeline's length (for example at free spans or buckle locations), areas of corrosion, areas of high stress or fatigue sensitive locations, areas with wall thickness reduction or deformities, any leak point, or any other area as prescribed by customers. These areas may be determined by other sources or inspections prior to employing embodiments of the present disclosure, or may be found as part of the system and method of the present disclosure.

Central to the present disclosure is an inspection tool which is capable of navigating to these hard to access areas. Example areas for offshore assets may include any point of the system from topside to the seabed and downhole. Onshore areas would focus on points where excavation is not practical, such as beneath roads, buildings, railways and other critical infrastructure. An embodiment of the inspection tool of the present disclosure is shown schematically in FIG. 3. The inspection tool is capable of performing a targeted inspection during which it collects high-intensity data on areas of interest. This data may be acquired utilizing eddy current, ultrasonic, visual, MFL, magnetic, or other inspection technology. The inspection tool will be capable of detecting and differentiating between internal, buried and external anomalies at areas of interest.

Verification and analysis of the data collected by this system and method produces a usable report. Each report shows an overview of the asset inspected and highlights the areas of interest which were found and analyzed. A detailed analysis for each area of interest is provided, which will identify features of note and the presence of any anomalies detected. An estimate on remaining life of the system may additionally be provided.

Embodiments of the inspection tool utilized to perform this localized type of inspection consist of several subsystems which work cognitively to provide high intensity scans of previously identified areas of interest (AOI) from other inspection methods. The main subsystems in this case are: two-way communication, localized travel for areas of interest, long distance travel between areas of interest and sensor deployment and scanning.

Figure 5:
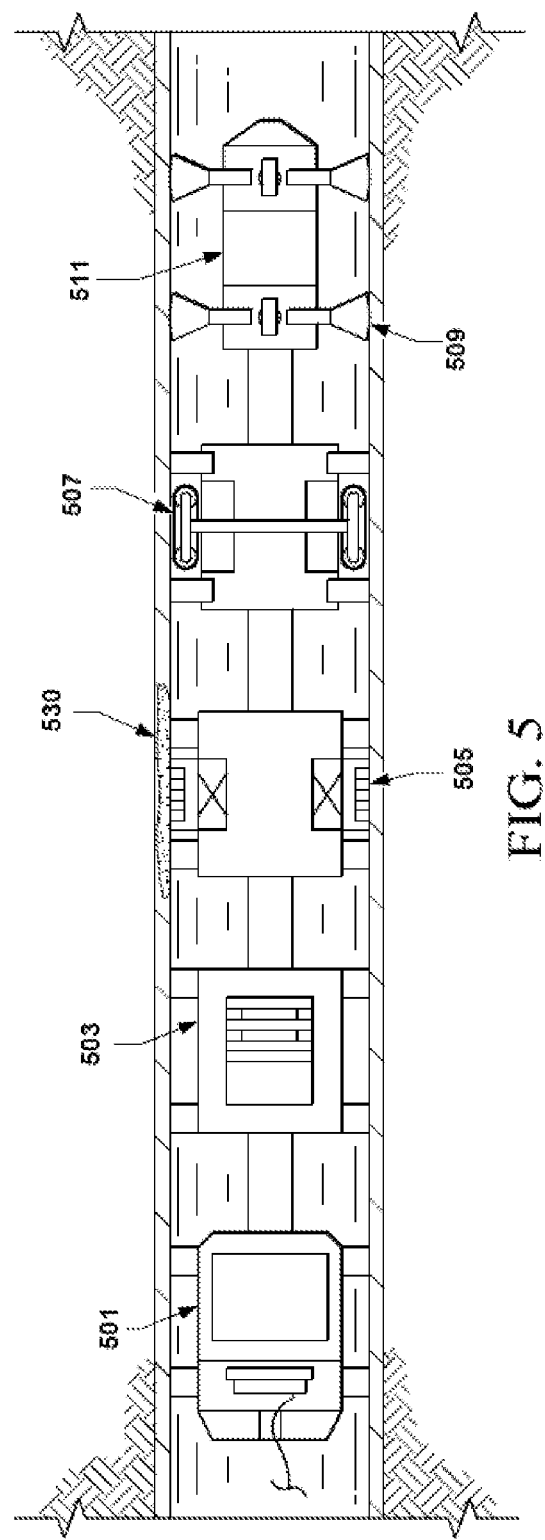
FIG. 5 illustrates an embodiment of the localized travel drive system of the present disclosure.

One embodiment of the inspection tool of the present disclosure is a hybrid design between a flow-driven navigation system and a self-propelled drive system, as shown in FIGS. 4 and 5. In particular, FIG. 4 shows the inspection tool as used in long-distance travel, whereas FIG. 5 shows the inspection tool used in localized travel.

Referring to FIG. 4, the inspection tool 400 is placed within a pipeline 420, wherein the inspection tool 400 comprises a communications module 401, a controller/power module 403, a sensor module 405, a drive module 407, an adjustable seal 409, and a transmitter 411 signaling the area of interest. The communications module 401, the sensor module 405, the drive module 407, and the adjustable seal 409 are operatively coupled with and controlled by the controller/power module 403. Specifically, the communications module 401 is capable of transmitting a start/stop signal to a remote controller 411. When long distance travel is desired, the communications module 401 transmits a start signal to the remote controller 411 to start the fluid flow inside the pipeline 420. At the same time, the adjustable seal 409 is switched to full seal mode to take advantage of the resulting fluid flow, thus allowing high speed transportation between areas of interest. When localized travel and scanning is desired, the communications module 401 transmits a stop signal to the remote controller 411 to stop the fluid flow inside the pipeline 420. At the same time, the adjustable seal 409 is switched to full bypass mode such that the inspection tool can perform scanning with minimal position shifting due to any fluid flow inside the pipeline. As discussed above, for NDT to achieve optimal testing results, it is important to reduce fluid flow inside the pipeline utilizing the adjustable seal. As shown in FIG. 4, the adjustable seal 409 is an iris-type seal further discussed below with regard to FIG. 9. As shown in FIG. 5, the adjustable seal 509 is a variable pitch seal further discussed below with regard to FIGS. 10-11. The operation will be further detailed below.

The communication module 401 can use different communication technologies, such as tethering, pressure transducer or extremely low frequency (ELF). The communication module 401 in FIG. 4 uses ELF as an embodiment, whereas the communication module 501 in FIG. 5 uses tethering as an embodiment. However, other communication technologies can also be used.

The sensor module 405 can be any known non-destructive testing sensor modules or combinations thereof, depending on the intended conditions. As known in the art, sensors using eddy current, ultrasonic, visual, MFL, or magnetic readings can be used. As seen in FIGS. 4 and 5, the sensor module 405 has a retracted position (FIG. 4) and an extended position (FIG. 5). In the long distance travel configuration in FIG. 4, the inspection tool 400 is travelling to its destination without the need for inspection, and is therefore retracted to prevent any possible damage to the sensor module. In the localized travel mode in FIG. 5, the inspection tool is approaching the area of interest, and therefore the sensor module 405 is adjusted to the extended position to contact the inner wall of the pipeline 420. This ensures that the sensor module 405 is protected during the long distance travel, and starts testing the pipeline during the slower, localized travel near the area of interest.

In the present disclosure, there are numerous drive mechanisms that can be utilized to drive the tool once it has reached an area of interest which include, but are not limited to, clutch-controlled wheels, a tracked tank-drive system, or roller-type drive. They are generally referred to as the drive module in the inspection tool, and will be explained in more details with reference to FIGS. 12-14.

The drive module 407 allows the inspection tool to engage with the inner wall of the pipeline 420, to allow either parking or moving toward either direction through a motor. As further illustrated with regard to FIGS. 12-14, the drive module 407 can be a clutch drive wheel system (FIG. 12) or a self-propelled track drive (FIGS. 13-14).

Figure 12:
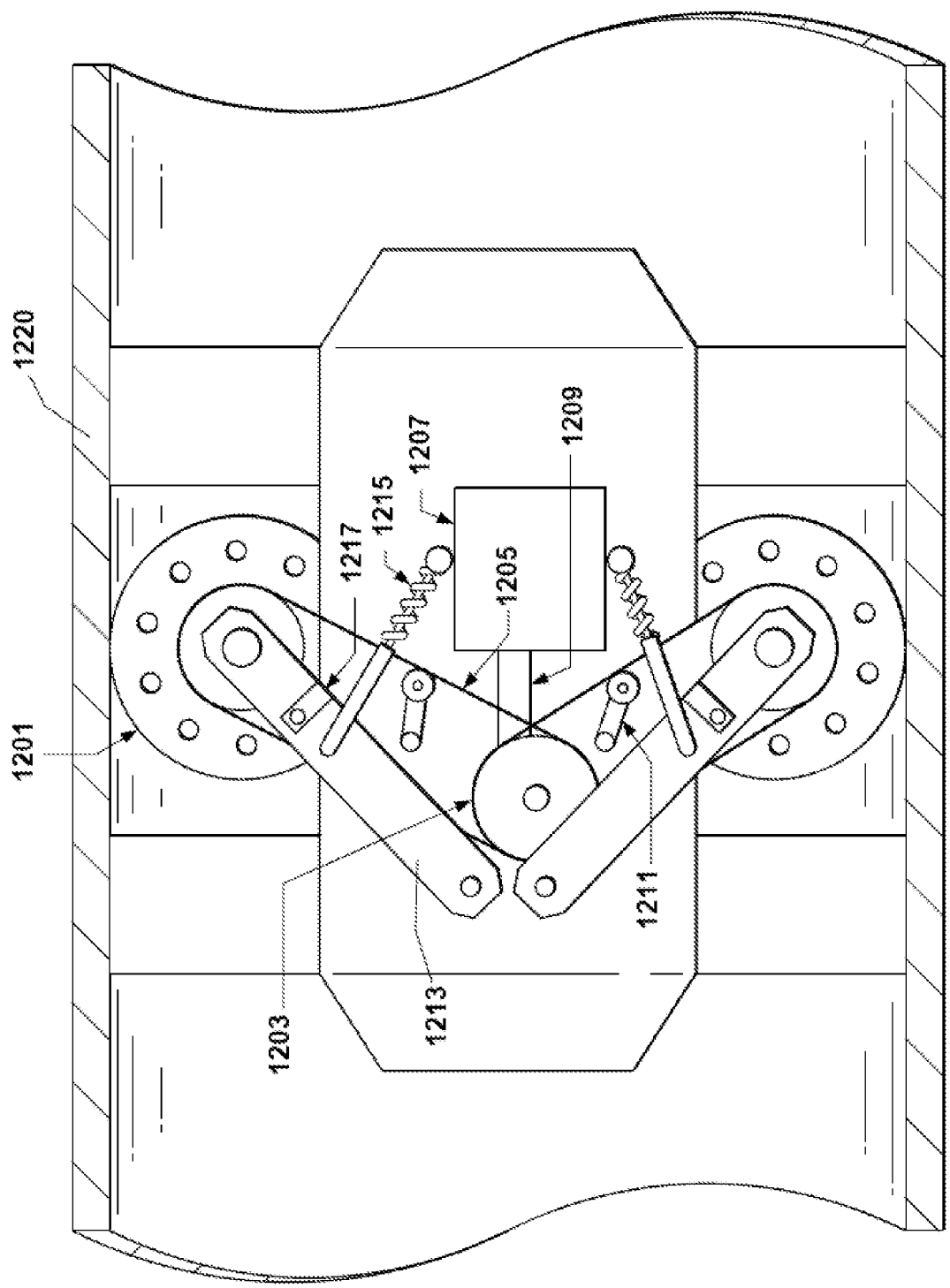
FIG. 12 illustrates a clutch drive wheel system of an embodiment of the present disclosure.

Referring also to FIG. 12, an embodiment of the clutch drive wheel system comprises drive wheels 1201 that are coupled to a drive wheel with clutch 1203 through drive belts 1205 or other similar mechanisms such as a drive chain. The drive wheel with clutch 1203 is driven by the motor 1207 through the drive shaft 1209. Tension pulleys 1211 are operatively coupled with the drive belt to ensure proper operation of the drive belts 1205. Further, position shaft 1213 and return springs 1215 are provided such that the drive wheels 1201 always contact the pipeline 1220 to ensure correct axial position in the pipeline. Additionally, encoder sensors 1217 are also in place to track the turning of the drive wheel 1201 to generate digital position and motion information, and confirms with the controller/power module 403.

In operation, when the inspection tool is being driven by the fluid inside the pipeline during long distance travel, the clutch is disengaged, and the drive wheels 1201 can spin freely. However, when the inspection tool moves close to an area of interest, the controller/power module 403 actuate the motor 1205 and the clutch 1203, which engages the drive wheels 1201 through the drive belt 1209 to slow down the inspection tool. According to the operation condition, the motor 1207 can then drive the inspection tool at a controlled rate allowing the tool to move at a precise rate (both forwards and backwards) over the area of interest. This allows the inspection tool to perform multiple scans if necessary.

Figure 13:
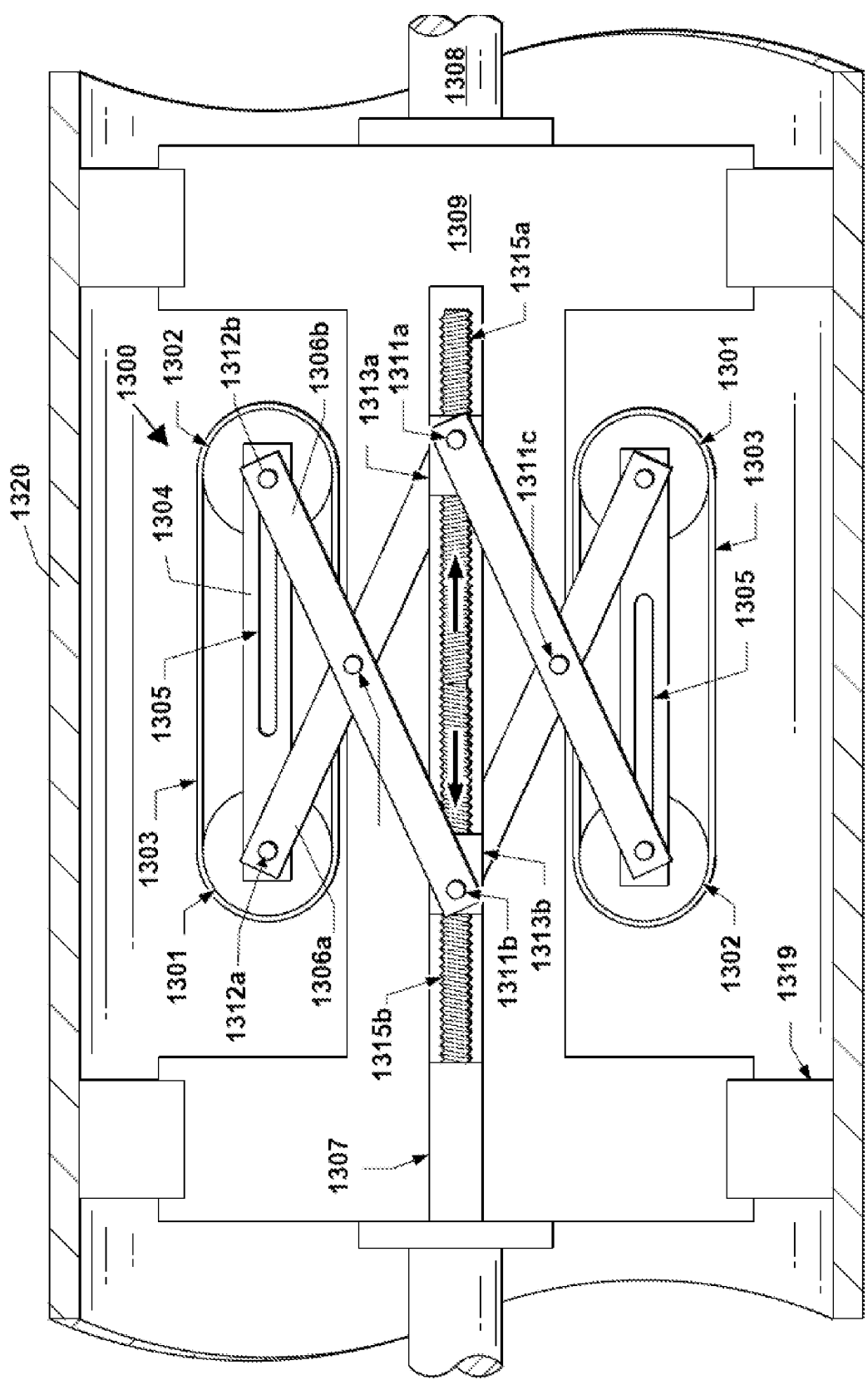
FIG. 13 illustrates the retracted position of a track drive system of an embodiment of the present disclosure.
Figure 14:
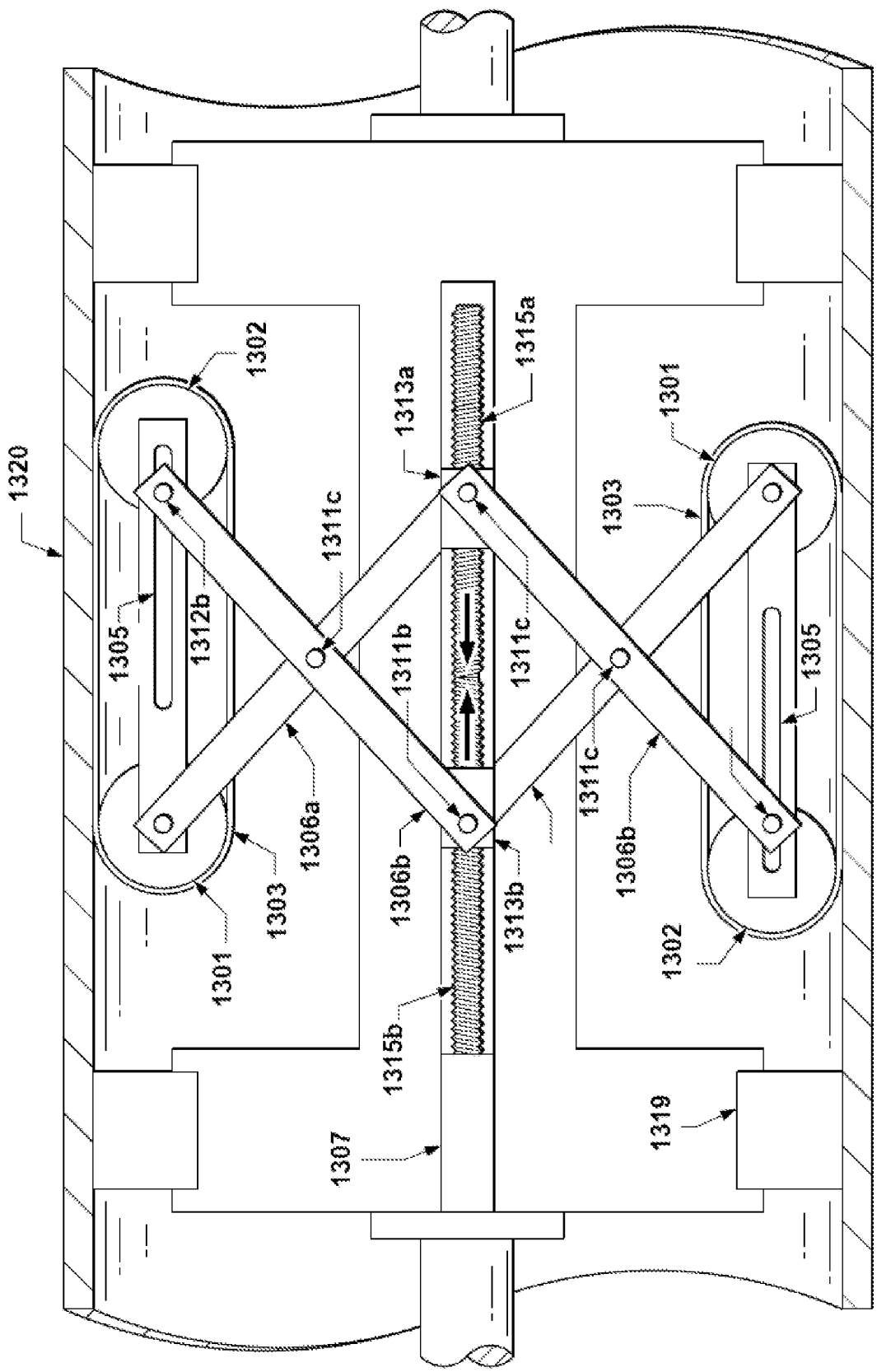
FIG. 14 illustrates the extended position of a track drive system of an embodiment of the present disclosure.

Referring now to FIGS. 13 and 14, which illustrate an embodiment of a track drive system. In FIG. 13, the track drive system is in a retracted position that the track does not touch the inner wall of the pipeline, whereas in FIG. 14, the track drive system is in an extended position and the track contacts inner wall of the pipeline. In more detail, the track drive system 1300 comprises two sets of track drive wheels 1301, track idler wheel 1302, and tracks 1303 on either side of the center of the inspection tool string 1308. The track drive wheel 1301 is connected to the track idler wheel 1302 by a retainer 1304, and a slot 1305 is provided on the retainer 1304. Each set of the track drive wheels/idler wheel/tracks 1301/1302/1303 is operatively coupled to an extension/retraction motor 1307 by an adjustment arm 1306a,b, which are pivotally connected in the middle at pivot 1311c. The adjustment arm 1306a has one end 1311a pivotally connected to a threaded nut actuator 1313a, which in turn actuates right handed thread nut 1315a; the other end 1312a of the adjustment arm 1306a is pivotally connected to the retainer 1304. Similarly, the adjustment arm 1306b has one end 1311b pivotally connected to a threaded nut actuator 1313b, which in turn actuates left handed thread nut 1315b; the other end 1312b of the adjustment arm 1306b is capable of sliding within the slot 1305 on the retainer 1304. Both the threaded nut actuators 1313*a,b* and the threaded nuts 1315*a,b* are connected to the extension/retraction motor 1307. The extension/retraction motor 1307 can move between an extended position and a retracted position.

In FIG. 13, the extension/retraction motor 1307 rotates the nuts 1315*a,b*, thereby bringing the threaded nut actuators 1313*a,b* closer together and drives the track drive system from the retracted position toward an extended position by pushing the adjustment arms 1306*a,b* radially outward until the tracks 1303 touch the inner wall of the pipeline 1320.

The diameter of the body 1309 of the track drive system is smaller than the inner diameter of the pipeline 1320 for easier maneuver therein, and centralizing material 1319 are added annularly to keep the drive system in the center of the pipeline.

To retract the drive module from the extended position, as shown in FIG. 14, the extension/retraction motor 1307 is actuated to rotate in the opposite direction, thereby driving the threaded nut actuators 1313*a,b* further apart, which pulls the adjustment arms 1306*a,b* radially inward and pull the tracks 1303 away from the inner wall of the pipeline 1320. The mechanism works similarly to a scissor jack. However, other mechanisms can be used to accomplish the extension/retraction of the drive system.

Comparing to the wheels in FIG. 12, the track-drive system in FIGS. 13-14 has a high contact area on the pipeline wall and provides a very firm grip in the pipeline. This allows the tool to make very precise movements in the line both in the forward and reverse directions, which enables the tool to make multiple scans of the area(s) of interest.

The flow-driven navigation system is used for high speed, long distance travel between areas of interest. The self-propelled drive system is used to drive the inspection tool only in areas of interest and provide very precise speed control and direction within the area(s) of interest.

When utilizing a hybrid drive system described above, communication with the pipeline's pump operator is essential. The flow driven system is partially reliant on the operator shutting down flow when the tool approach(s) an area of interest. There are several methods of communication, but not limited to, Extremely Low Frequency (ELF) communication, Fiber Optic Tether, Guided Wave, and pulsed transducer messaging. This communication is bi-directional and used to issue and receive commands from the inspection tool.

Additionally, in the case of communication loss the tool will default to high speed travel mode so the tool can be easily retrieved.

Figure 6:
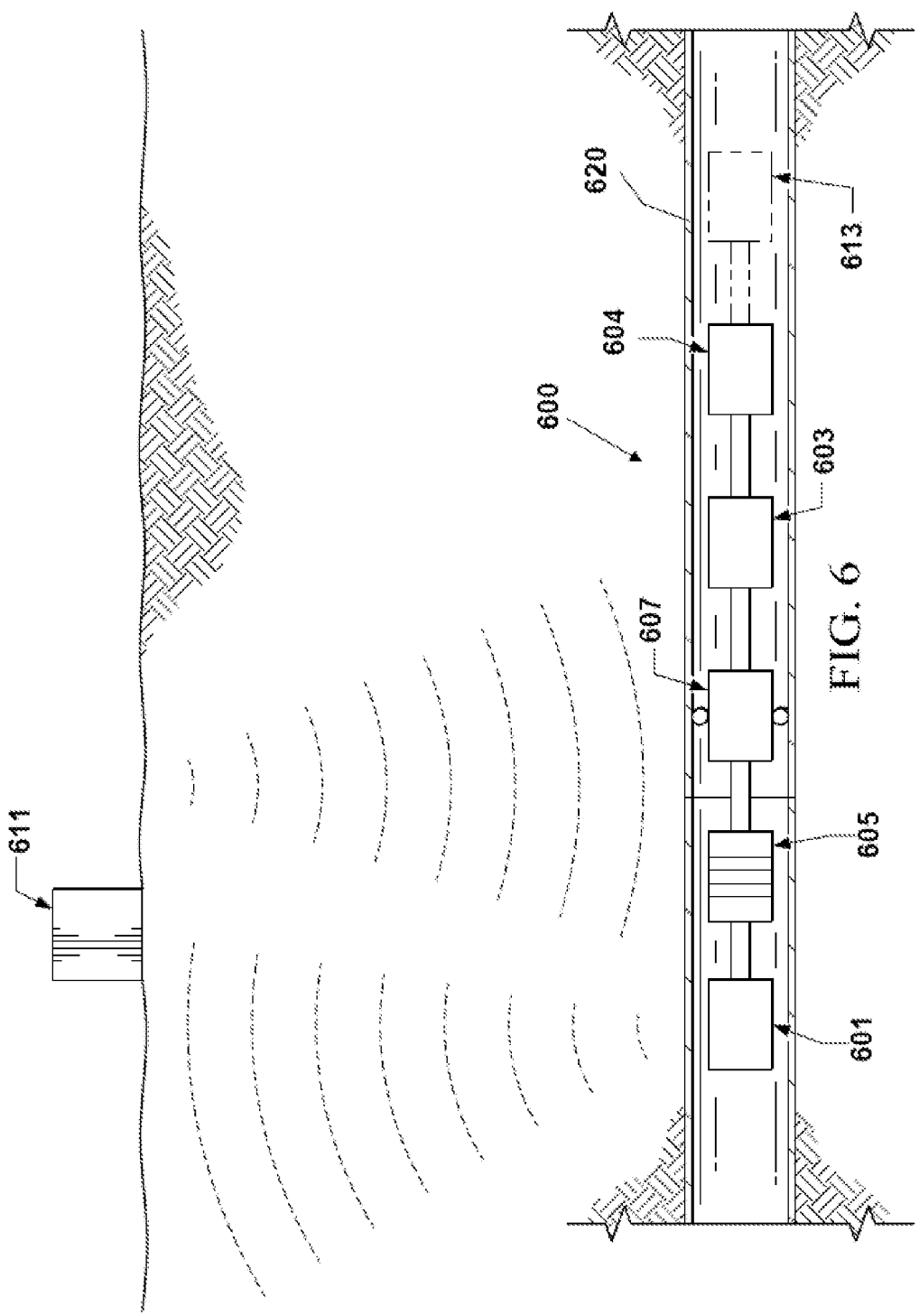
FIG. 6 illustrates the ELF communication system of an embodiment of the present disclosure.

FIG. 6 shows an embodiment of the present disclosure using an Extremely Low Frequency (ELF) communication method. Similar to FIG. 4, an ELF communication module 601, an inspection module 605, a drive module 607 are operatively connected to the power module 603 and processor 604. If necessary, additional modules 613 can also be connected. Due to the fact that ELF communication bandwidth is limited, only simple commands can be issued and received. In this case an ELF transmitter/receiver box 611 is placed near the area of interest. The box 611 is setup to continuously transmit a signal at the area of interest. Once the inspection tool comes into range of the ELF box 611, the communication module 601 will send its own ELF signal via an onboard transmitter to the ELF box acknowledging that it is approaching the area of interest and to discontinue fluid flow in the pipeline. At this point the tool's drive module 607 and inspection module 605 will be extended and take over and scan the area of interest. Multiple scans can be performed within the range of the ELF box 611 by reversing using the drive module 607. Once the scan is completed and the onboard drive module 607 and inspection module 605 are retracted, the communication module 601 will transmit a resume command to the ELF box 611, which can be relayed to the pipeline operator. The fluid flow inside the pipeline can be resumed to drive the inspection tool 600 to the next area of interest.

Figure 7A:
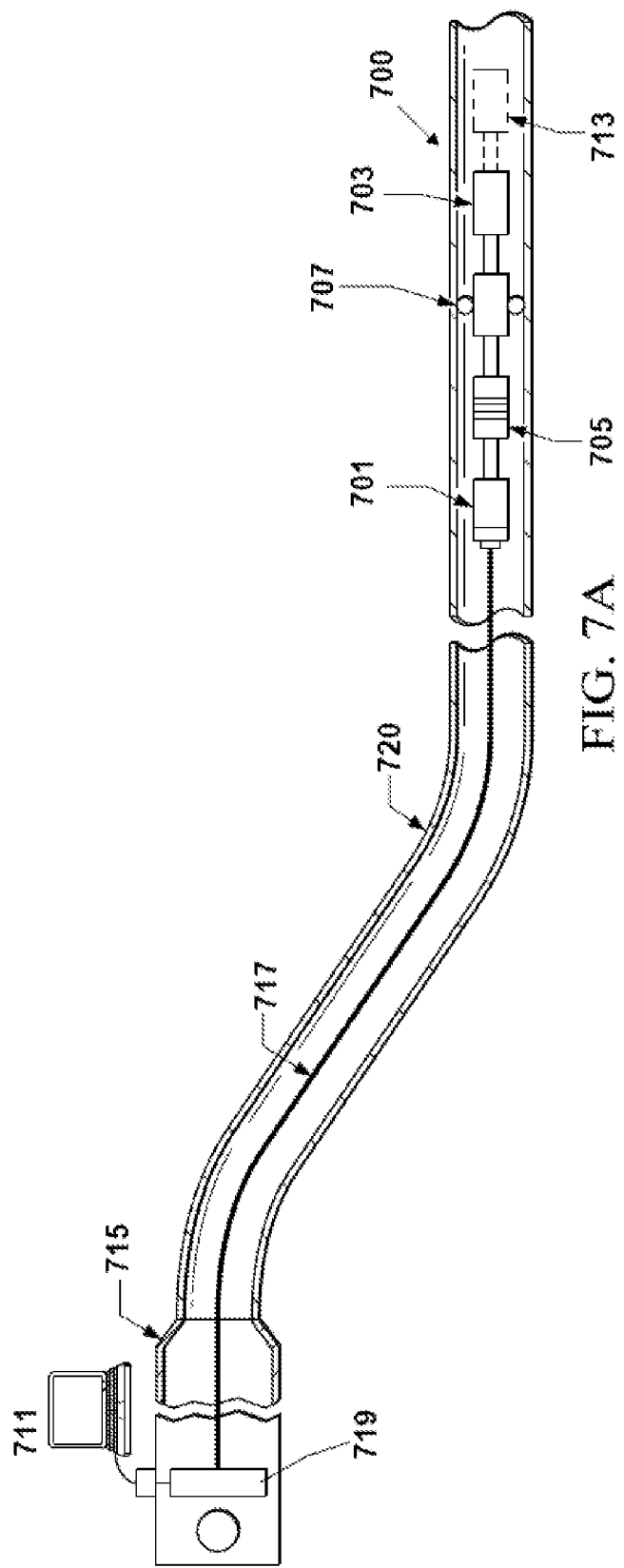
FIG. 7A-B illustrates the fiber optic tethered communication system of an embodiment of the present disclosure.
Figure 7B:
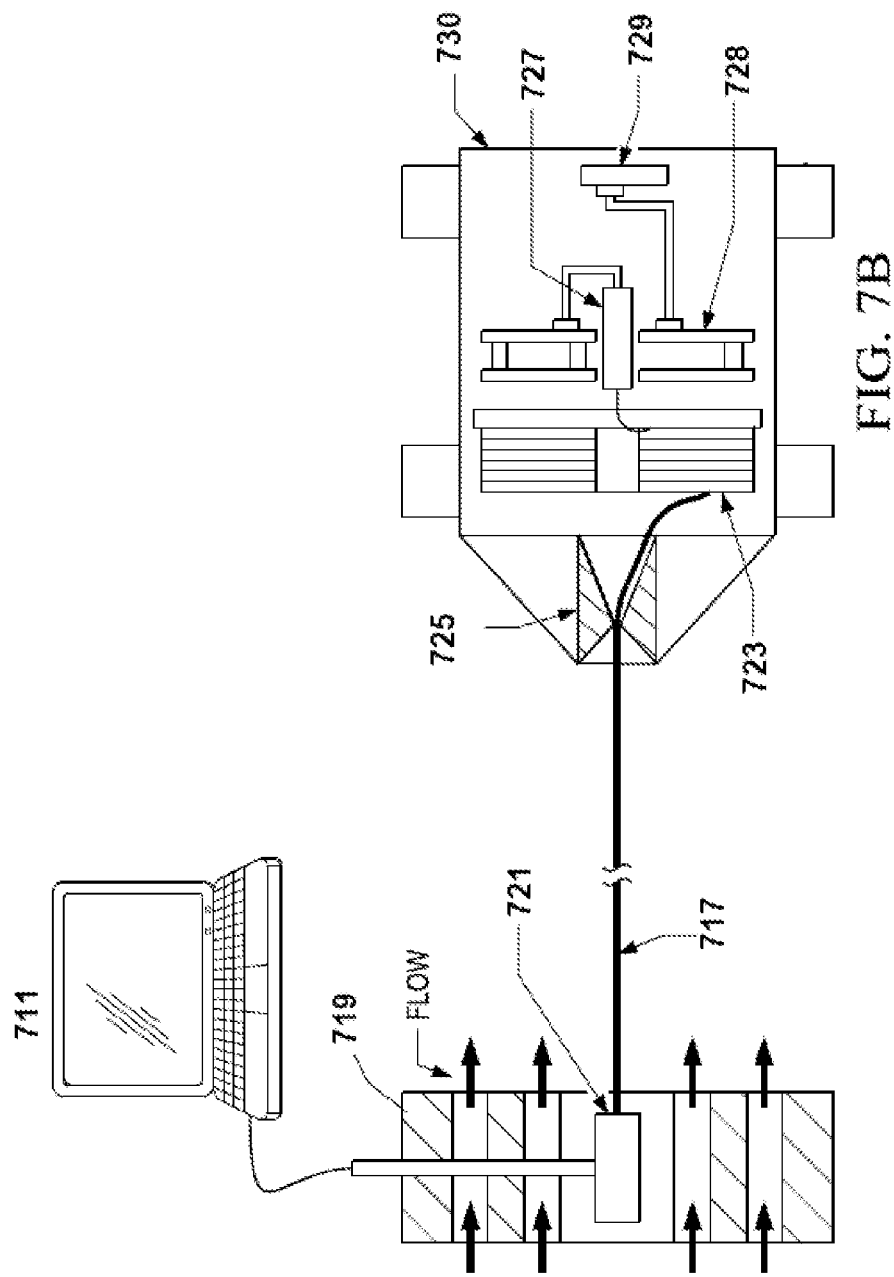

FIG. 7A-B illustrates another embodiment of the present disclosure that uses a Fiber-Optic tether 717 from the communication module 701 for communication. The inspection tool 700 is placed inside a pipeline 720, and the inspection tool 700 comprises a communication module 701, an inspection module 705, a driver module 707 and optional modules 713 that are operatively connected to the power/controller module 703. Generally, if the fiber optic is deployed from a base station 719 within a launcher 715, tethers limit the amount of distance a tool can travel based on the number of fittings the tool has to go through. In this case the limit is generally about 270 degrees worth of fittings (for example, three (3) 90 degree elbows, or six (6) 45 degree bends). In this case the tether 717 is deployed from the tool itself, particularly from the communication module 701. This eliminates the fitting restriction on the tether. The method allows for constant communication between the inspection tool 700 and a remote computer 711, while also allows the inspection tool 700 to measure distance from the launch point. This method mitigates the issue of having to place and ELF box near the area of interest which can be difficult to do in many circumstances (for example, bottom of the ocean, or under a road with high depth of cover). The limitation in this case is how much tether can be stored onboard the tool and how the tether is retrieved after the inspection.

FIG. 7B illustrates the embodiment of fiber optic deployed from the inspection tool with detailed communication between the communication module 701 and the remote computer 711. The base station 719 is fluid-permissible in order not to block he fluid flow within the pipeline 720. The remote computer 711 is connected, wired or wireless, to a fiber optic transmitter/receiver 721, which connects with the fiber optic tether 717. The tether 717 is released from the spool 723 of fiber optic cable through the centralized guider 725 inside the tool body 730. The tool body 730 encompass the spool 723, a fiber optic transmitter/receiver 727, communication electronics 728 and an interface 729 connecting to other modules of the inspection tool 700. The spool 723 is also connected to a fiber optic transmitter/receiver 727 inside the tool body 730 to transmit or receive signals through the fiber optic tether. In this configuration, the remote computer 711 can directly receive or issue commands to the inspection tool 700.

As discussed above, the tether can be deployed from the base station 719, the spool 723 within the tool 700, or both. In certain embodiments, the capability to deploy the tether from both the base station 719 and the spool 723 may be necessary if the reverse deployment of the tool is necessary to remove the tool from the pipeline. Using a prespooled fiber optic cable allows the user to easily determine the location of the tool in case where the need for trouble shooting arises.

FIGS. 8A-B illustrates another embodiment of the present disclosure, which utilizes the fluid in the line itself to communicate with the tool. In this case, sound travels faster in fluids and solids than it does in a gas. By setting up a base station 819 in the launcher with a pressure transducer, a signal 840 can be sent through the fluid within the pipeline itself in the form of a pressure wave. The signal can then be received by the pressure transducer 801 in the tool, or vice versa.

Referring to FIG. 8B, which shows the detailed configuration of this embodiment. The base station 819 comprises a pressure transducer 833 that is capable of transmitting a signal in the form of pressure waves 840. Similarly, the inspection tool also comprises an identical pressure transducer 801 to be able to receive and transmit commands back to the base station 819. One can preprogram the tool and the base station to recognize the number pressure pulses as a particular command to allow for a two-way communication. The limitation of this method is line length as the signal will attenuate the farther it gets down the line. This method is useful in acoustically viable products.

In this embodiment, the tool has an onboard capability to slow itself in the line to compensate for the time lag it may take between sending a shutdown command to the pipeline operator and actual shutdown of flow in the line. This involves but is not limited to utilizing an iris type seal (illustrated in FIG. 9A-B) or a variable pitch type seal (illustrated in FIGS. 10 and 11) that can open and close to increase or decrease bypass around the tool. The localized drive system, described above, can also be deployed to provide additional drag and control the tool's position when approaching an area of interest.

Figure 9B:
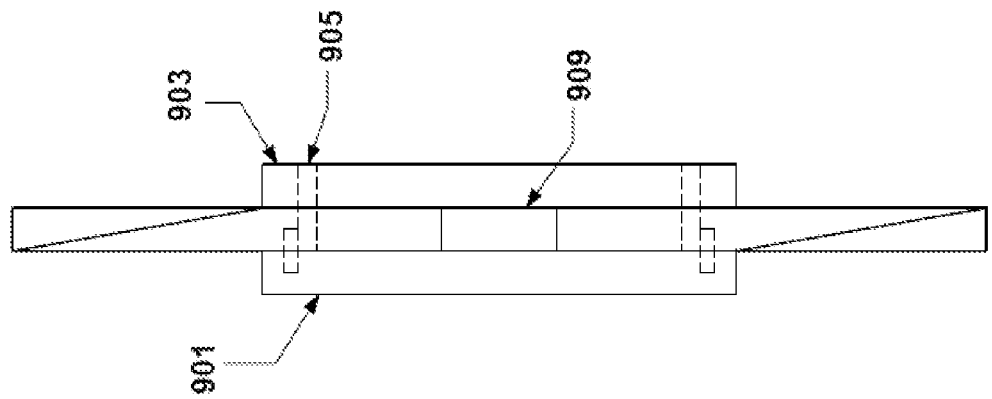
FIG. 9A-B illustrates an iris type expandable drive seal of an embodiment of the present disclosure.
Figure 9A:
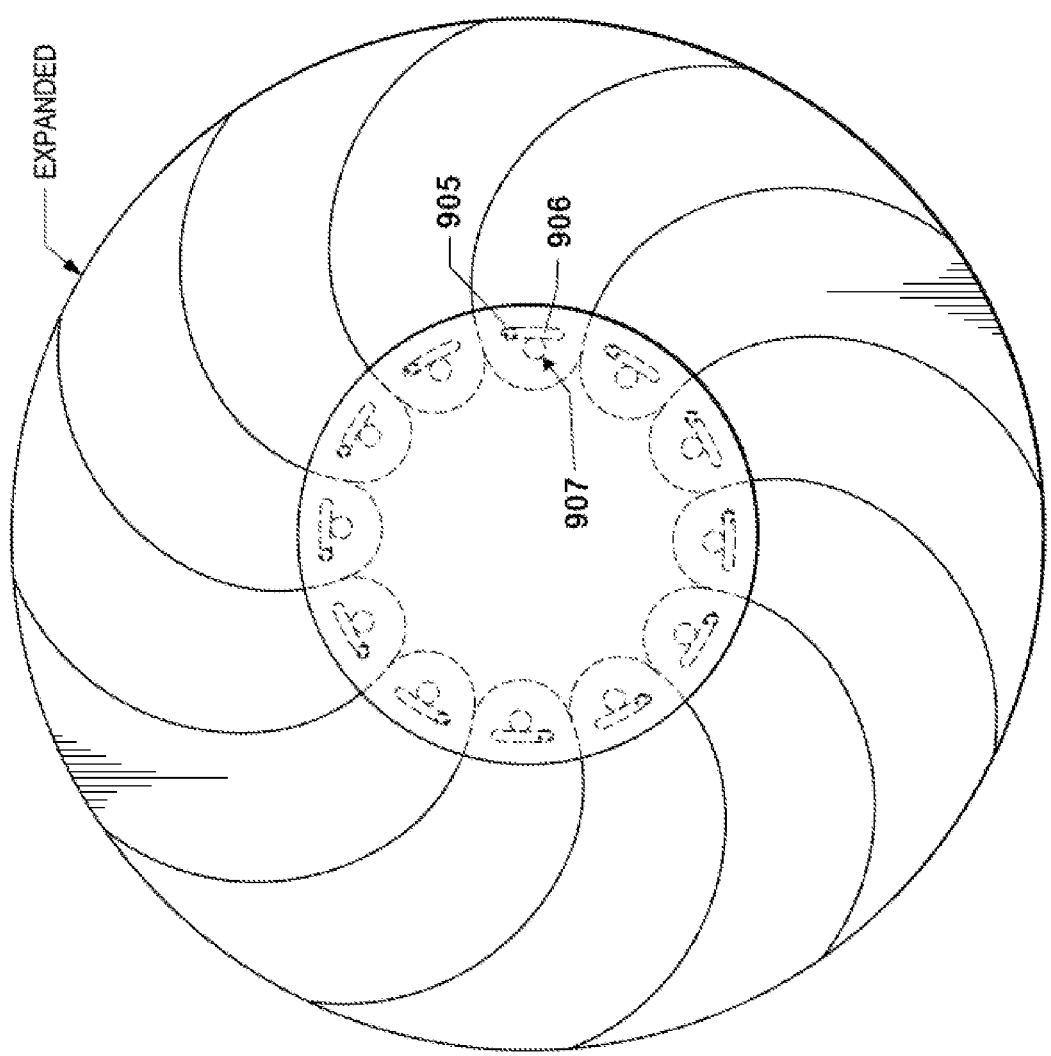

The iris-type seal illustrated in FIG. 9A can expand or contract to control the amount of fluid bypass around the tool. This seal allows the tool to speed up or slow down based on a fixed flow rate in the pipeline. When the seal is fully expanded, the amount of bypass is minimal which provides the maximum amount of drive available from the fluid in the pipeline. When the iris seal contracts, it increases bypass around the inspection tool and slows down the tool. FIG. 9B is a side view of the iris-type seal. A control spindle 901 is coupled with a plurality of support plates 903 through rotation pins 905. The control spindle 901 has a series of slots 906 in which the actuation pins 905 are situated. These actuation pins 905 are attached to the support plates 903. With the rotation of the control spindle 901 the actuation pins 905 follow the slots 906 in the control spindle and rotate the support plates 903 inward or outward. The support plates 903 rotate around corresponding axis pins 907. The movement of the control spindle 901 around the bearing 909 pushes or pulls the support plates 903, thereby expanding or retracting the surface area of the seal.

Figure 10B:
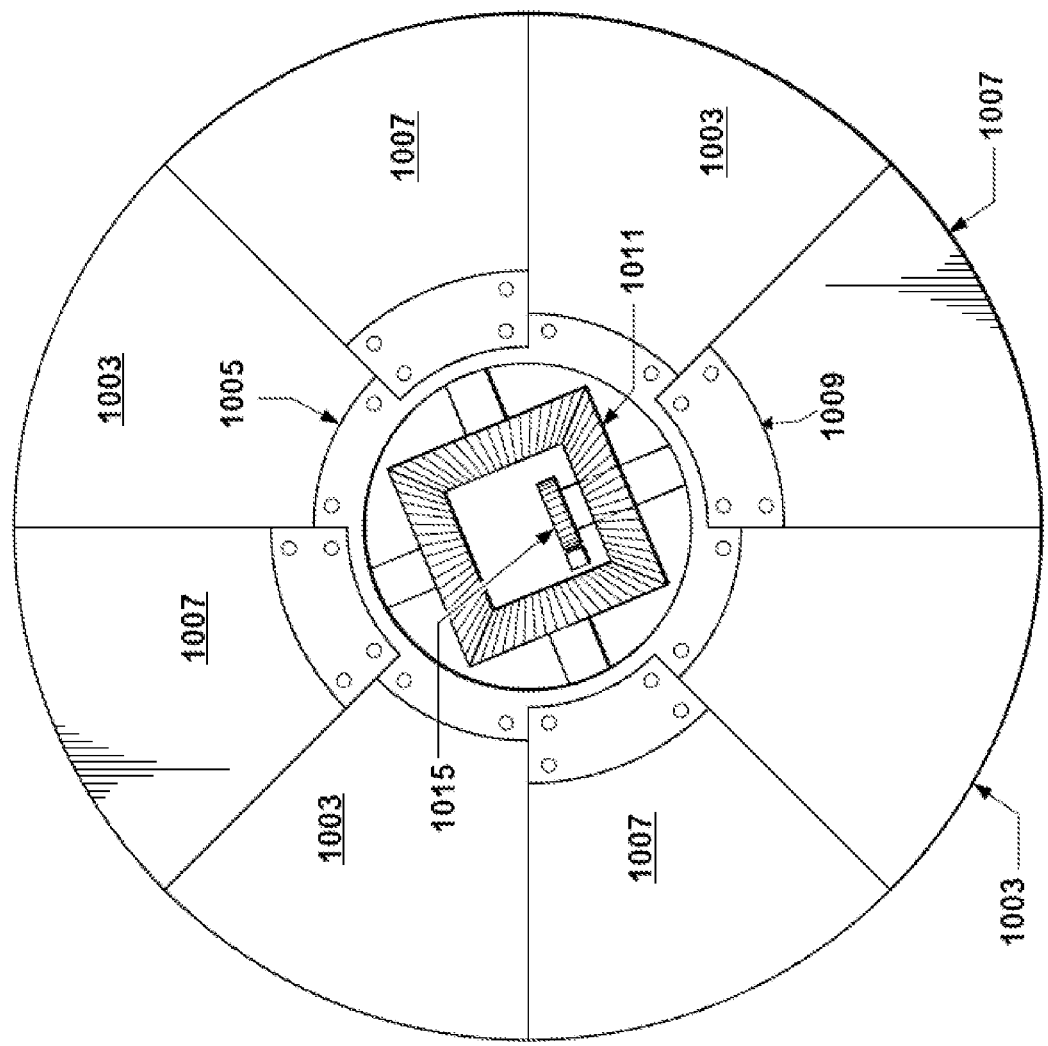
FIG. 10A-B illustrates the closed position of a variable pitch seal of an embodiment of the present disclosure.
Figure 10A:
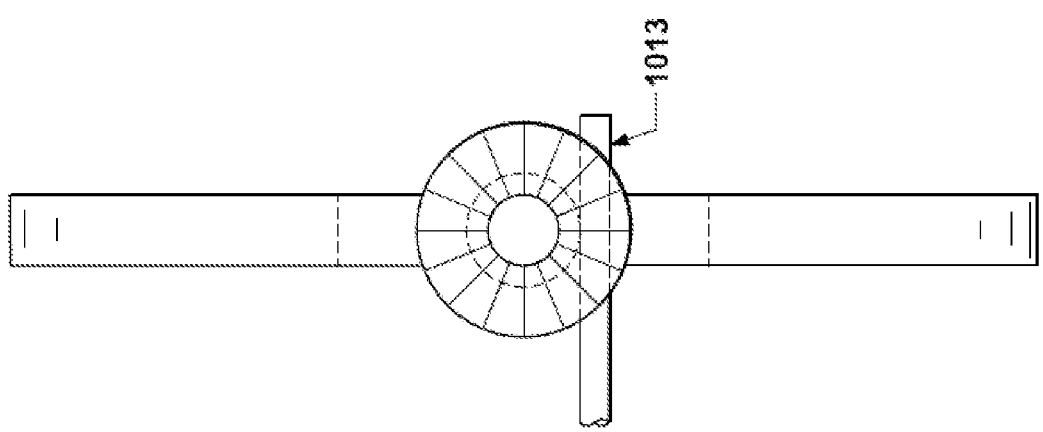
Figure 11B:
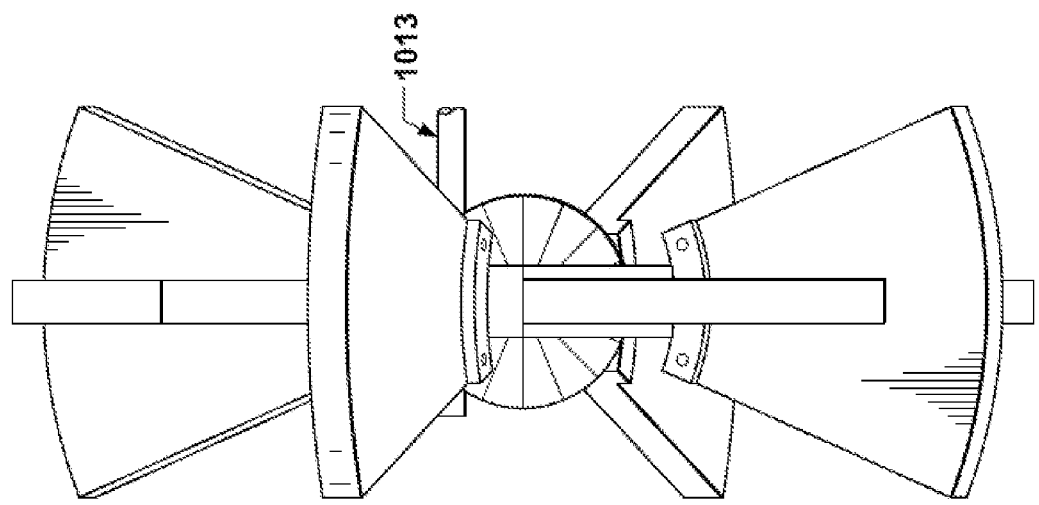
FIG. 11A-B illustrates the open position of a variable pitch seal of an embodiment of the present disclosure.
Figure 11A:
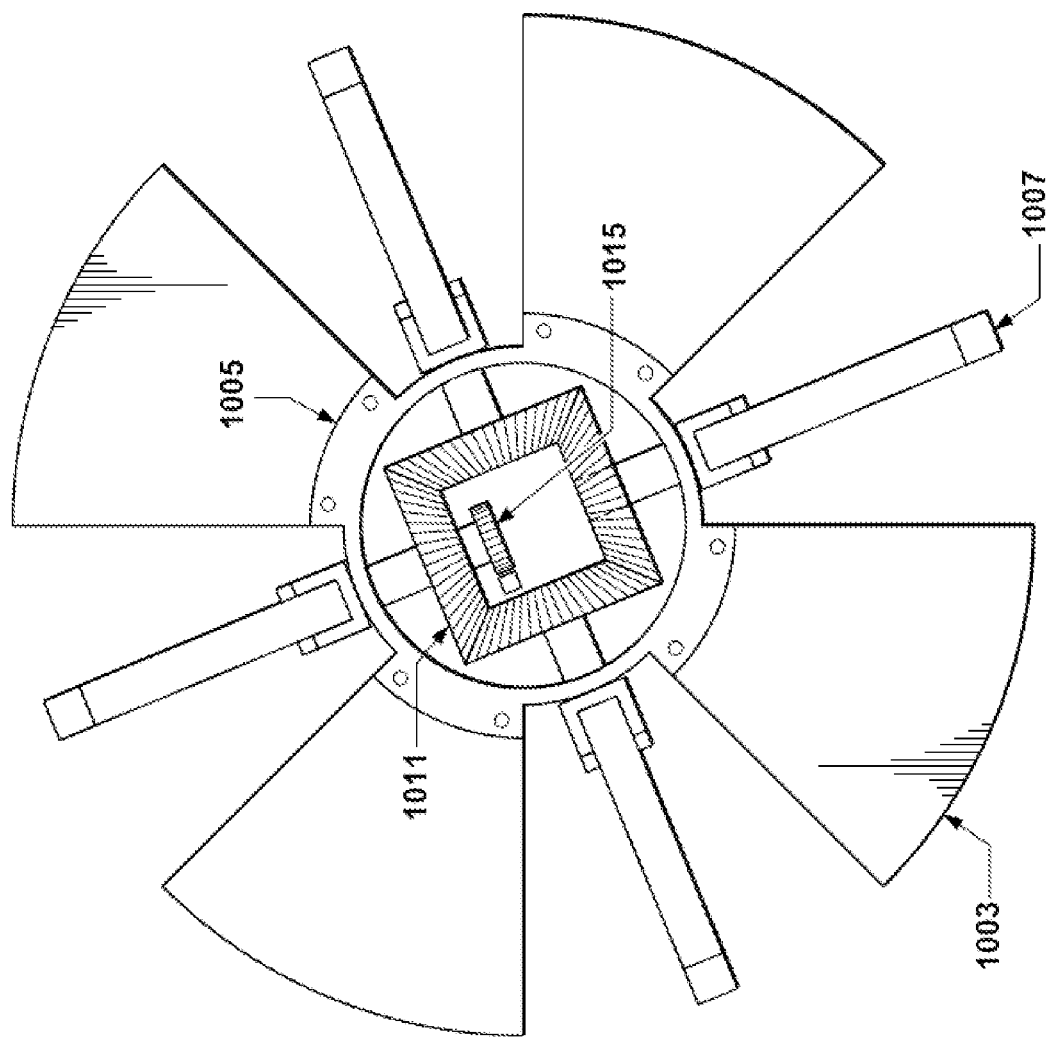

The variable-pitch type seal illustrated in FIGS. 10A-B and 11A-B is similar to a variable pitch propeller used on aircraft. FIG. 10A-B shows the seal in the closed position and FIG. 11A-B shows the seal in the open position. In the embodiment shown, the seal is made of eight (8) veins. Four static blades 1003 in this case are statically mounted on a static blade mount 1005 to keep module centered in the pipe and four variable blades 1007 are mounted on corresponding variable mount 1009 rotating bases. The pitch of the rotating blades 1007 can be altered via a set of bevel gears 1011, actuated by actuating gears 1015 at the end of an actuating rod 1013. The pitch can be altered from a fully open (FIG. 11, parallel to the pipe flow direction) or to a fully closed position (FIG. 10, perpendicular to pipe flow direction). When the seal is fully closed, the amount of bypass is minimal which provides the maximum amount of drive available from the fluid in the pipeline. When the seal is in the fully open position bypass is increased slowing down the tool. Since the pitch can be varied easily this can provide very precise flow speed. This is very useful when approaching area(s) of interest and can help compensate for any delays in communication between issuing a shutdown command and actual stoppage of flow.

With the inspection tool of this disclosure, it is possible to quickly send the inspection tool over a long distance using fluid-driven travel system, and when the inspection tool approaches the area of interest, activating the localized travel system to allow the inspection tool to accurately detect any defect in the pipes.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. An inspection tool for inspecting a localized area of interest within a pipeline, the tool comprising:
   (a) a communication module providing communication between the inspection tool and a remote controller;
   (b) a sensor for detecting and analyzing abnormality within the localized area of interest;
   (c) a long distance travel system;
   (d) a localized travel system; and
   (e) a controller configured for
   controlling the localized travel system and the long distance travel system of the inspection tool, wherein the long distance travel system is a flow-driven navigation system configured for:
      operating by blocking fluid flow in the pipeline when repositioning the inspection tool within the pipeline, and
      not operating by unblocking fluid flow in the pipeline under a bypass mode when repositioning the inspection tool by the localized travel system.

2. The inspection tool of claim 1, wherein the communication module uses extremely low frequency (ELF), fiber optic, guided wave, or pulsed transducer for communication.

3. The inspection tool of claim 1, wherein the inspection tool further comprises an adjustable seal to allow variation of fluid flow through the adjustable seal.

4. The inspection tool of claim 3, wherein the adjustable seal is an iris-type seal.

5. The inspection tool of claim 3, wherein the adjustable seal is a variable pitch seal.

6. The inspection tool of claim 1, wherein the localized travel system is a self-propelled drive system.

7. The inspection tool of claim 6, wherein the localized travel system is selected from clutch-controlled wheels, a tracked tank-drive system, or a roller-type drive.

8. The inspection tool of claim 1, wherein the sensor is configured between an extended position configured for contacting surfaces of the area of interest and a retracted position without contacting the surfaces of the area of interest.

9. The inspection tool of claim 1, wherein the localized drive system is configured between an extended position configured for contacting surfaces of the area of interest and a retracted position without contacting the surfaces of the area of interest.

10. The inspection tool of claim 1, wherein the sensor detects the abnormality through radiography, external or internal ultrasonic inspection, Magnetic Flux Leakage (MFL) or eddy current, acoustic emission, computed tomography, or combinations thereof.

11. A method for performing an inspection of an area of interest in a pipe, the method comprising the steps of:
   (a) conveying an inspection tool into the pipe, the inspection tool comprising a communication module, a sensor, a long distance travel system, and a localized travel system;
   (b) activating the long distance travel system until the inspection tool is proximate the area of interest;
   (c) activating the localized travel system to perform the inspection of the area of interest;
   wherein the long distance travel system is a flow-driven navigation system configured for:
      operating by blocking fluid flow in the pipeline when repositioning the inspection tool within the pipeline, and
      not operating by unblocking fluid flow in the pipeline under a bypass mode when repositioning the inspection tool by the localized travel system; and
   (d) detecting and analyzing abnormality within the localized area of interest by a sensor.

12. The method of claim 11, wherein in step (b) the sensor or the localized travel system are configured in a retracted position without contacting the inner wall of the pipe.

13. The method of claim 11, wherein in step (c) the sensor or the localized travel system are configured in an extended position to contact surfaces within the inner wall of the pipe.

14. The method of claim 11, wherein the communication module uses extremely low frequency (ELF), fiber optic, guided wave, or pulsed transducer for communication.

15. The method of claim 11, wherein the inspection tool further comprises an adjustable seal to allow variation of fluid flow through the adjustable seal, wherein the adjustable seal is an iris-type seal or a variable-pitch seal.

16. The method of claim 11, wherein the localized travel system is a self-propelled drive system.

17. The method of claim 16, wherein the localized travel system is selected from clutch-controlled wheels, a tracked tank-drive system, or a roller-type drive.

18. The method of claim 11, wherein the sensor detects the abnormality through radiography, external or internal ultrasonic inspection, Magnetic Flux Leakage (MFL) or eddy current, acoustic emission, computed tomography, or combinations thereof.

19. The method of claim 11, wherein in step (c) further comprises:
   (c-1) stopping fluid flow within the pipe.

* * * * *